US012752726B2

(12) United States Patent
Kawamoto

(10) Patent No.: US 12,752,726 B2
(45) Date of Patent: Oct. 6, 2026

(54) MULTI-PURPOSE VEHICLE

(71) Applicant: Kubota Corporation, Osaka (JP)

(72) Inventor: Kazuyoshi Kawamoto, Sakai (JP)

(73) Assignee: Kubota Corporation, Osaka (JP)

( * ) Notice: Subject to any disclaimer, the term of this patent is extended or adjusted under 35 U.S.C. 154(b) by 230 days.

(21) Appl. No.: 18/806,766

(22) Filed: Aug. 16, 2024

(65) Prior Publication Data

US 2025/0058727 A1 Feb. 20, 2025

(30) Foreign Application Priority Data

Aug. 18, 2023 (JP) ................................ 2023-133494

(51) Int. Cl.
*B60R 16/04* (2006.01)
*B60K 1/04* (2019.01)

(52) U.S. Cl.
CPC ...... *B60R 16/04* (2013.01); *B60K 2001/0422* (2013.01); *B60K 2001/0433* (2013.01)

(58) Field of Classification Search
CPC ............ B60R 16/04; B60K 2001/0422; B60K 2001/0433
See application file for complete search history.

(56) References Cited

U.S. PATENT DOCUMENTS

2006/0096797 A1* 5/2006 Tsuchiya ............. H01M 10/613 180/68.5
2013/0330579 A1* 12/2013 Ejiri ...................... H01M 50/30 429/53
2015/0207126 A1* 7/2015 Chorian .................. B60L 50/66 429/158
2020/0044401 A1* 2/2020 Uemura .................. B60L 53/14
2020/0161721 A1* 5/2020 Wang ................ H01M 10/6567
2020/0185671 A1* 6/2020 Ng ........................ H01M 50/24

FOREIGN PATENT DOCUMENTS

JP 201747796 A 3/2017

* cited by examiner

*Primary Examiner* — Timothy Hannon
(74) *Attorney, Agent, or Firm* — The Webb Law Firm

(57) ABSTRACT

A vehicle body includes a pair of left and right body frames 2, a battery 15 for supplying power to an optional device retrofittable to the vehicle body, and a mounting section 31 to which a bus bar 30, which is for supplying current from the battery 15 to the optional device, is detachably mountable. The bus bar 30 is located above the battery 15 while mounted to the mounting section 31.

6 Claims, 3 Drawing Sheets

MULTI-PURPOSE VEHICLE

CROSS-REFERENCE TO RELATED APPLICATION

This application claims priority to Japanese Patent Application No. 2023-133494 filed Aug. 18, 2023, the disclosure of which is hereby incorporated by reference in its entirety.

BACKGROUND OF THE INVENTION

1. Field of the Invention

The present invention relates to a multi-purpose vehicle.

2. Description of Related Art

There is a conventional multi-purpose vehicle configured to enable the mounting of an optional part such as a work light, as described in JP 2017-047796A, for example.

SUMMARY OF THE INVENTION

With such a multi-purpose vehicle, when mounting an optional part that requires a supply of power from a battery, electricity is supplied from the battery to the optional device via a bus bar. At this time, wiring from the battery to the bus bar needs to be provided. However, in conventional multi-purpose vehicles, depending on the positional relationship between the bus bar and the battery, the wiring may become complicated.

Also, it may not be necessary to mount an optional part that requires a supply of power from the battery, and in such a case, it has been disadvantageous for an unnecessary bus bar to remain mounted.

An object of the present invention is to provide a multi-purpose vehicle that can avoid complicated wiring between a battery and a bus bar, and enables omitting the bus bar in the case where power does not need to be supplied from the battery.

A multi-purpose vehicle according to an aspect of the present invention includes: a vehicle body including a pair of left and right body frames; a battery configured to supply power to an optional device retrofittable to the vehicle body; and a mounting section to which a bus bar is detachably mountable, the bus bar being configured to supply current from the battery to the optional device, the bus bar being located above the battery while the bus bar is mounted to the mounting section.

According to this invention, the bus bar is detachably mounted to the mounting section, thus making it possible to omit the bus bar when power does not need to be supplied from the battery. Also, the bus bar is located above the battery when mounted to the mounting section, thus making it possible to simplify the wiring between the battery and the bus bar, and making it possible to avoid complicated wiring between the battery and the bus bar.

In an aspect of the present invention, it is preferable that the multi-purpose vehicle further includes: a seat for a passenger, wherein the battery is located below the seat, and the mounting section is located behind the seat.

According to this configuration, the wiring connecting the battery to the bus bar is arranged in the space below and behind the seat. In other words, it is possible to utilize the space below and behind the seat for wiring between the battery and the bus bar.

In an aspect of the present invention, it is preferable that the multi-purpose vehicle further includes: a vertical frame extending in an up-down direction and supported by one of the left and right body frames, wherein the mounting section is provided in the vertical frame.

According to this configuration, the bus bar mounted to the mounting section is supported by one of the vehicle body frames via the vertical frame, thus making it possible for the bus bar to be firmly supported.

In an aspect of the present invention, it is preferable that the battery and the vertical frame are supported by the one of the left and right body frames.

According to this configuration, the vertical frame that supports the battery and the mounting section is disposed on either one of the left and right body frames, and thus the battery and the mounting section are disposed closer to each other. As a result, the wiring between the battery and the bus bar can be made more compact.

In an aspect of the present invention, it is preferable that the bus bar is mounted to the mounting section via a stay.

According to this configuration, the bus bar is mounted to the mounting section via the stay. When mounting the bus bar to the mounting section, work such as screwing a bolt directly to the bus bar is not performed, thus making it possible to suppress damage to the bus bar that may accompany such mounting work.

In an aspect of the present invention, it is preferable that the stay includes a flat portion covering the bus bar from above.

According to this configuration, the flat portion can protect the bus bar from raindrops, flying debris, and the like from above. Also, the stay includes the flat portion at a location different from the location where the bus bar is mounted. This configuration makes it possible to increase the strength of the stay.

In an aspect of the present invention, it is preferable that the stay is fixed to the mounting section by being fastened to the mounting section using a fastening member.

According to this configuration, by using a fastening member such as a bolt, the stay can be easily mounted to the mounting section and detached from the mounting section.

BRIEF DESCRIPTION OF THE DRAWINGS

The terms Fig., Figs., Figure, and Figures are used interchangeably in the specification to refer to the corresponding figures in the drawings.

DESCRIPTION OF THE INVENTION

An embodiment of the present invention will be described below with reference to the drawings. In the following description, unless otherwise stated, the direction of an arrow FW in the figures is "forward", the direction of an arrow BK is "backward", the direction of an arrow LH is "leftward", and the direction of an arrow RH is "rightward". Also, the direction of an arrow UP in the figures is "upward", and the direction of an arrow DW is "downward".

[Overall Configuration]

Figure 1:
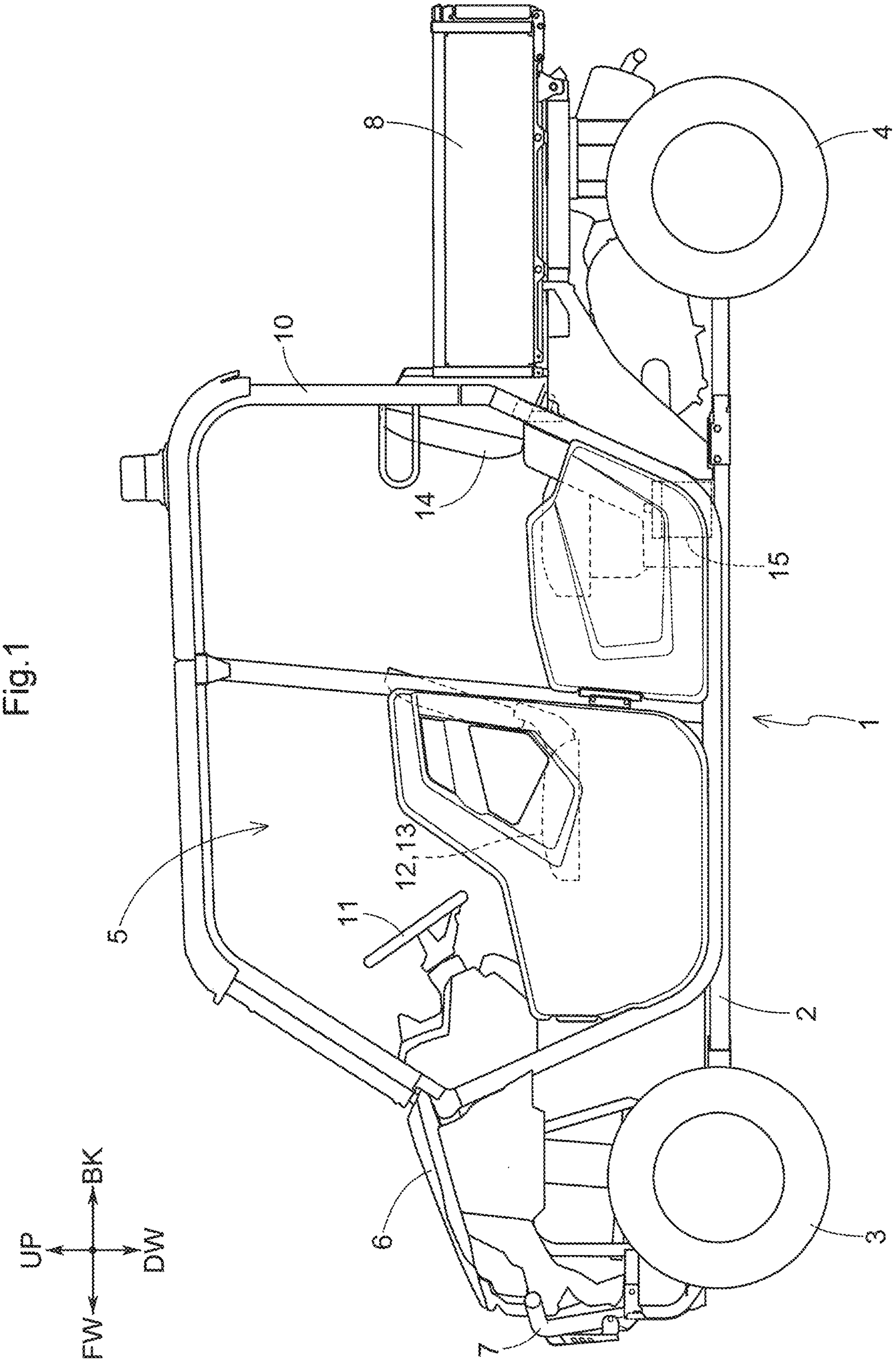
FIG. 1 is a side view of a multi-purpose vehicle.

FIG. 1 shows a multi-purpose vehicle. The multi-purpose vehicle includes left and right body frames 2 that constitute the lower layer of a vehicle body 1. Right and left front wheels 3 are supported by front portions of the body frames 2, and right and left rear wheels 4 are supported by rear portions of the body frames 2.

The vehicle body 1 includes a riding section 5 that can be boarded by a passenger, between the front wheels 3 and the rear wheels 4. A front lid 6 that covers the front portions of the body frames 2 from above is provided at a front portion of the riding section 5. A front bumper 7 is provided in front of the front lid 6. A loading bed 8 is provided behind the riding section 5.

[Riding Section]

The riding section 5 includes a ROPS frame 10 that protects the passenger if the vehicle body 1 falls over. The ROPS frame 10 is formed by bending a rod-shaped member, and spans from the front portion to the rear portion of the riding section 5.

The riding section 5 also includes a steering wheel 11 for steering the front wheels 3, and a driver seat 12 in which the passenger operating the steering wheel 11 can sit. The driver seat 12 is disposed in the front portion of the riding section 5. An auxiliary passenger seat 13 in which another passenger can sit is provided laterally rightward of the driver seat 12 in the riding section 5. Also, a rear passenger seat 14 (corresponding to a seat) in which another passenger can sit is provided behind the driver seat 12 and the auxiliary passenger seat 13.

Figure 2:
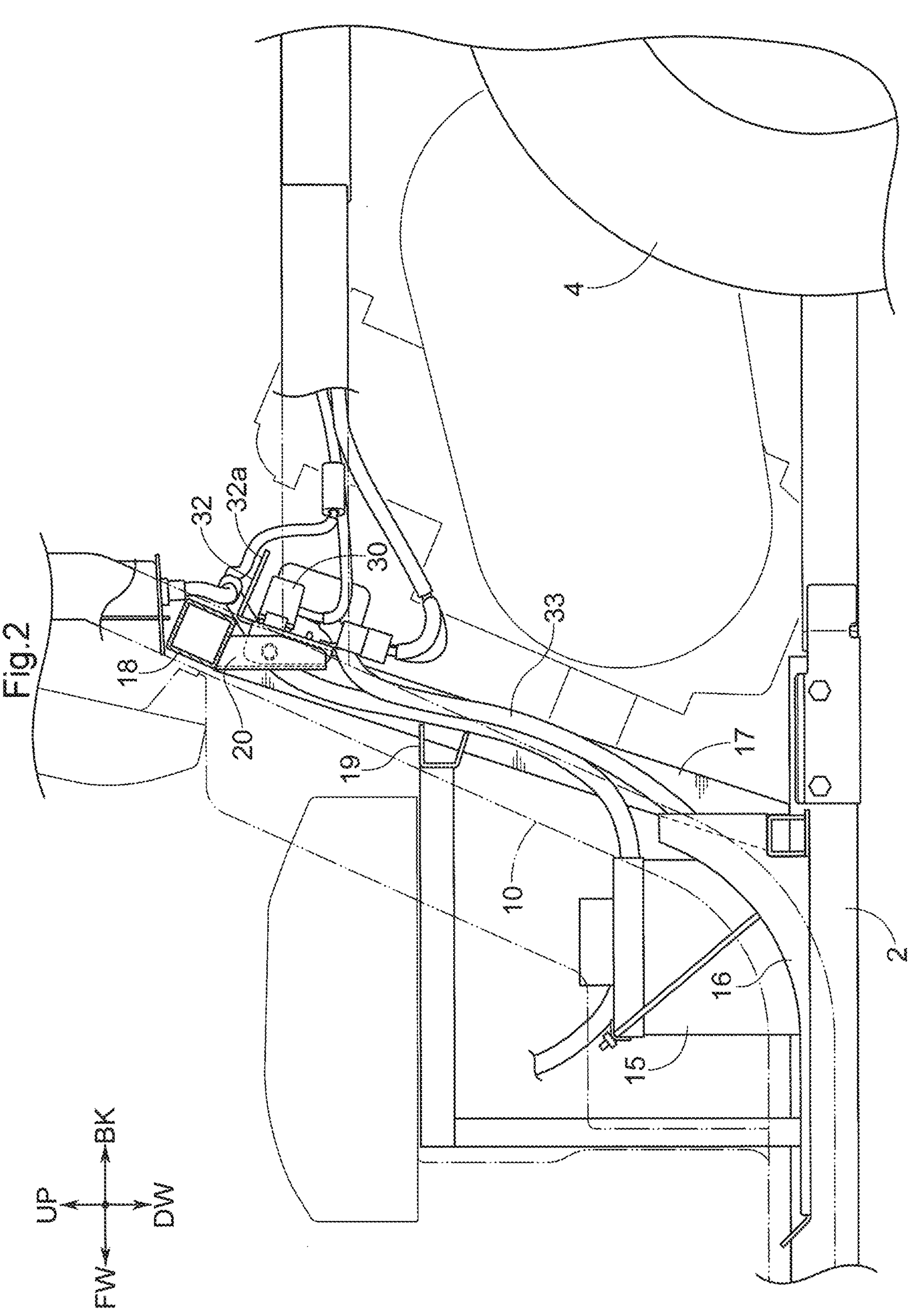
FIG. 2 is a side view illustrating a configuration of a mounting section.
Figure 3:
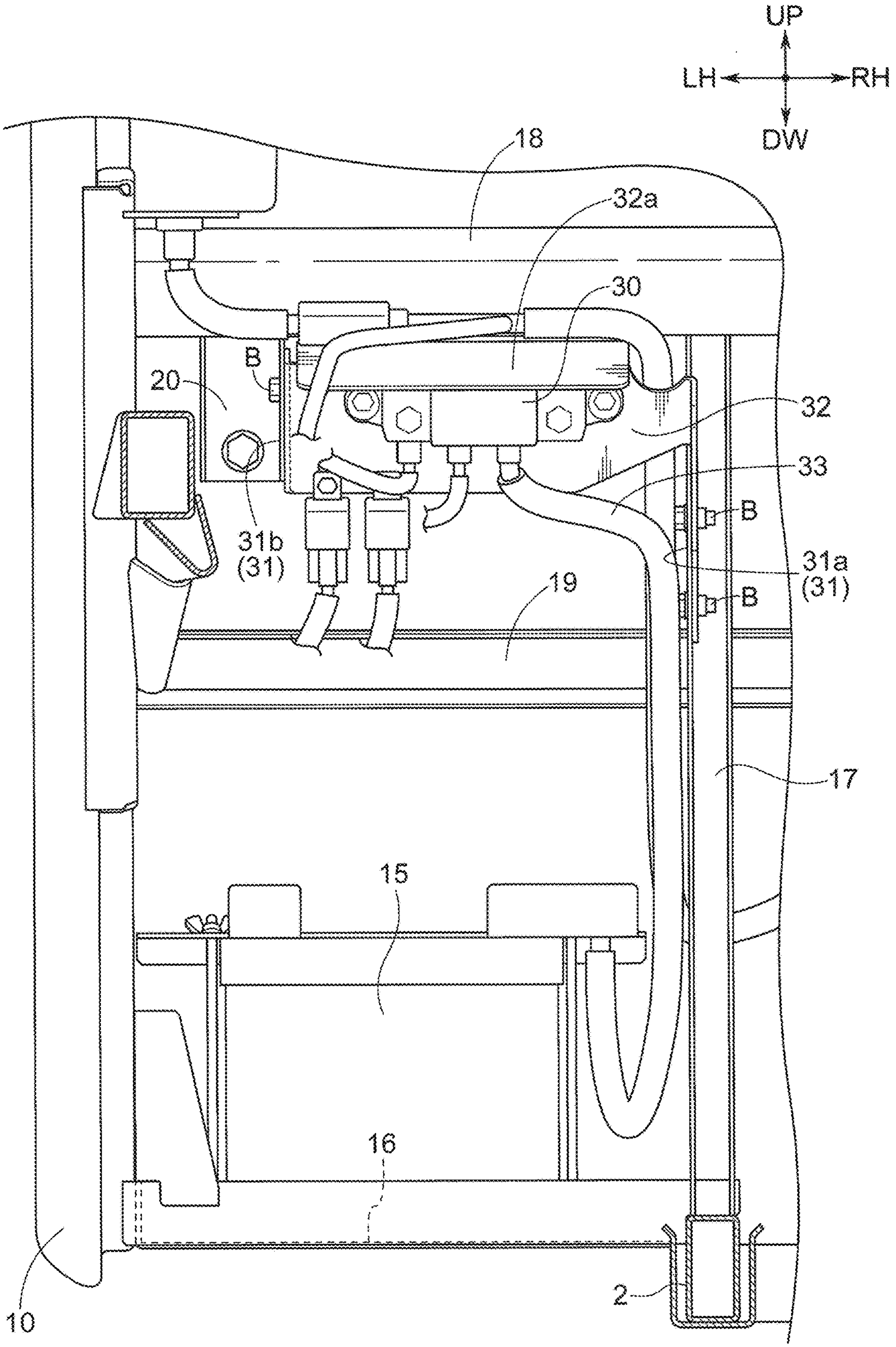
FIG. 3 is a rear view illustrating the configuration of the mounting section.

As shown in FIGS. 2 and 3, in the present embodiment, a battery 15 is provided below the rear passenger seat 14. The battery 15 is placed on a support base 16 and fixed to and supported by the same. As shown in FIG. 3, the lateral inward side of the support base 16 is supported by the left body frame 2. In other words, the battery 15 is supported by the left body frame 2. Also, the lateral outward side of the support base 16 is supported by a lower portion of the ROPS frame 10.

A vertical frame 17 extending in the up-down direction is supported by the left body frame 2. The vertical frame 17 is constituted by a channel member having a substantially C-shaped cross section. Note that although not shown, a vertical frame 17 extending in the up-down direction is similarly supported by the right body frame 2.

A horizontal frame 18 that supports the rear portion of the rear passenger seat 14 is supported by the upper ends of the left and right vertical frames 17. An intermediate frame 19 extending outward in the left-right direction of the body is supported by a vertically intermediate portion of the left vertical frame 17. Although not shown, regarding the right vertical frame 17 as well, an intermediate frame 19 extending outward in the left-right direction of the body is similarly supported by a vertically intermediate portion of the right vertical frame 17. The end portion of the intermediate frame 19 on the outward side in the left-right direction of the body is connected to the ROPS frame 10.

[Mounting of Optional Device and Optional Member]

As shown in FIGS. 2 and 3, the battery 15 supplies power to an optional device (not shown) that can be retrofitted to the vehicle body 1, such as a work light. The vehicle body 1 includes a mounting section 31 for detachably mounting a bus bar 30 for supplying current from the battery 15 to the optional device. The bus bar 30 is mounted to the mounting section 31 via a stay 32.

The mounting section 31 includes an inward mounting section 31*a* that supports the lateral inward side (right side) of the stay 32, and an outward mounting section 31*b* that supports the lateral outward side (left side) of the stay 32.

The inward mounting section 31*a* is provided in an upper portion of the vertical frame 17. The inward mounting section 31*a* has bolt holes formed in the vertical frame 17. The vertical frame 17 is approximately C-shaped and open rearward, and the stay 32 is mounted in such a manner that the lateral inward portion of the stay 32 abuts against an inward surface of the C-like shape of the vertical frame 17.

A support member 20 extends downward from a portion of the horizontal frame 18 that corresponds to the left side of the stay 32. The outward mounting section 31*b* is provided in the support member 20 and has a bolt hole formed in the support member 20. The stay 32 is mounted in such a manner that the lateral outward portion of the stay 32 abuts against the lateral inward surface of the support member 20.

The inward mounting section 31*a* and the outward mounting section 31*b* are located behind the rear passenger seat 14, and the bus bar 30 mounted to the mounting section 31 is located above the battery 15.

Bolt holes are respectively formed on the left (lateral outward) side and right (lateral inward) side of the stay 32. The stay 32 is fastened to the inward mounting section 31*a* and the outward mounting section 31*b* by bolts B (corresponding to fastening members) inserted into the left and right bolt holes of the stay 32 and the bolt holes of the inward mounting section 31*a* and the outward mounting section 31*b*. Also, the upper end of stay 32 is provided with a flat portion 32*a* that extends rearward from the upper end of stay 32 and covers the mounted bus bar 30 from above.

By mounting the stay 32 to the mounting section 31 and further electrically connecting the battery 15 to the bus bar 30 with a harness 33 or the like, the bus bar 30 can be used to supply current from the battery 15 to an optional device (not shown).

[Other Embodiments]

Hereinafter, other embodiments that are modifications of the above embodiment will be described.

(1) In the above embodiment, an example is described in which the stay 32 is mounted to the inward mounting section 31*a* and the outward mounting section 31*b*, but the present invention is not limited to the above embodiment, and the stay 32 may be mounted to only either the inward mounting section 31*a* or the outward mounting section 31*b*.

(2) In the above embodiment, an example is described in which the battery 15 is provided below the rear passenger seat 14, and the mounting section 31 is located behind the rear passenger seat 14, but the present invention is not limited to the above embodiment, and for example, the battery 15 may be provided below the driver seat 12 or the auxiliary passenger seat 13, and the mounting section 31 may be located behind the driver seat 12 or the auxiliary passenger seat 13.

(3) In the above embodiment, an example is described in which the mounting section 31 is provided in the vertical frame 17 and the support member 20, but the present invention is not limited to the above embodiment, and for example, a configuration is possible in which the mounting section 31 is provided in the horizontal frame 18.

(4) In the above embodiment, an example is described in which the battery 15 and the vertical frame 17 are supported by the left body frame 2, but the present invention is not limited to the above embodiment, and the battery 15 and the vertical frame 17 may be supported by the right body frame 2.

(5) In the above embodiment, an example is described in which the bus bar 30 is mounted to the mounting section 31 via the stay 32, but the present invention is not limited to the above embodiment, and the bus bar 30 may be directly mounted to the mounting section 31.

(6) In the above embodiment, an example is described in which the stay 32 has the flat portion 32*a*, but the present invention is not limited to the above embodiment, and a configuration is possible in which the stay 32 is not provided with the flat portion 32*a*.

The configurations disclosed in the above-described embodiment (including the other embodiments, which similarly applies below) can be applied in combination with configurations disclosed in other embodiments, as long as no contradiction arises.

Furthermore, the embodiments disclosed in this specification are merely examples, and the present invention is not limited to these embodiments, and can be modified as appropriate without departing from the scope of the present invention.

INDUSTRIAL APPLICABILITY

The present invention is applicable to a multi-purpose vehicle used for transporting people, for carrying luggage, for recreation, or the like.

LIST OF REFERENCE SIGNS

1 Vehicle body
2 Body frame
14 Rear passenger seat (seat)
15 Battery
17 Vertical frame
30 Bus bar
31 (31*a*, 31*b*) Mounting section
32 Stay
32*a* Flat portion
B Bolt (fastening member)

What is claimed is:

1. A multi-purpose vehicle comprising:
a vehicle body comprising a pair of left and right body frames;
a battery configured to supply power to an optional device retrofittable to the vehicle body;
a mounting section to which a bus bar is detachably mountable, the bus bar configured to supply current from the battery to the optional device,
wherein the bus bar is located above the battery while the bus bar is mounted to the mounting section;
a seat,
wherein the battery is located below the seat, and
wherein the mounting section is located behind the seat.

2. The multi-purpose vehicle according to claim 1,
wherein the bus bar is mounted to the mounting section via a stay.

3. The multi-purpose vehicle according to claim 2,
wherein the stay comprises a flat portion covering the bus bar from above.

4. The multi-purpose vehicle according to claim 2,
wherein the stay is fixed to the mounting section by being fastened to the mounting section using a fastening member.

5. A multi-purpose vehicle comprising:
a vehicle body comprising a pair of left and right body frames;
a battery configured to supply power to an optional device retrofittable to the vehicle body;
a mounting section to which a bus bar is detachably mountable, the bus bar configured to supply current from the battery to the optional device,
wherein the bus bar is located above the battery while the bus bar is mounted to the mounting section;
a vertical frame extending in an up-down direction and supported by one of the left and right body frames, and
wherein the mounting section is provided in the vertical frame.

6. The multi-purpose vehicle according to claim 5,
wherein the battery and the vertical frame are supported by the one of the left and right body frames.

* * * * *